Figure 5:
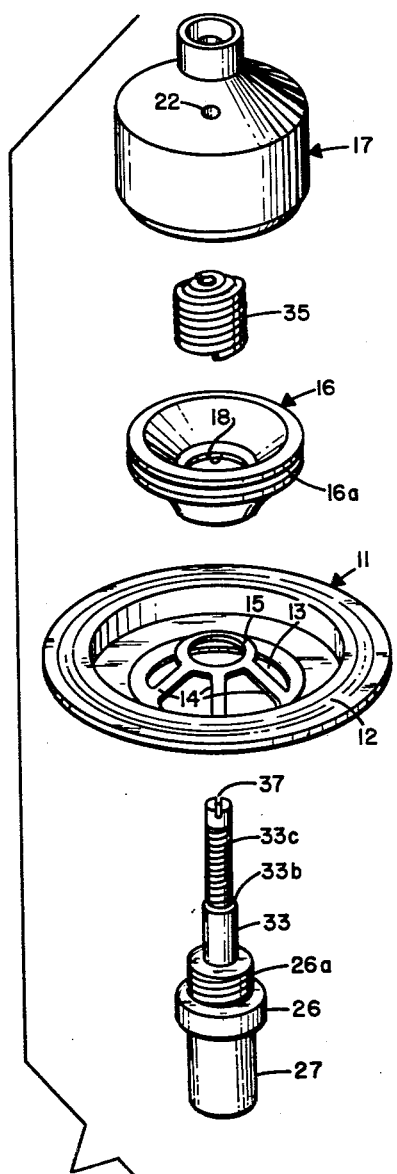

Oct. 27, 1964  G. P. SALIARIS  3,154,249
THERMOSTATIC VALVES
Filed April 18, 1963  2 Sheets-Sheet 1
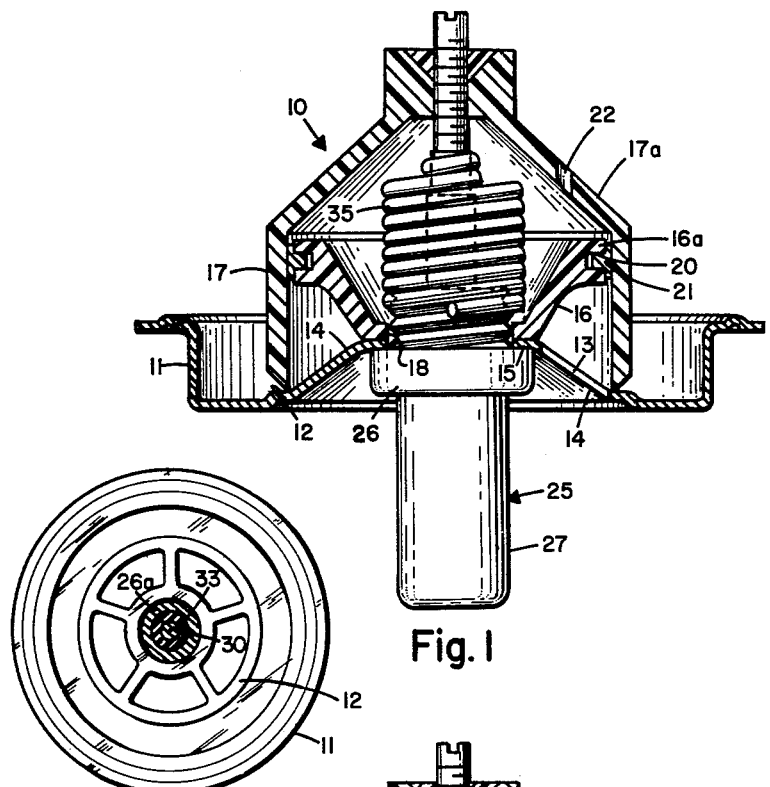
Fig. 1
Fig. 4
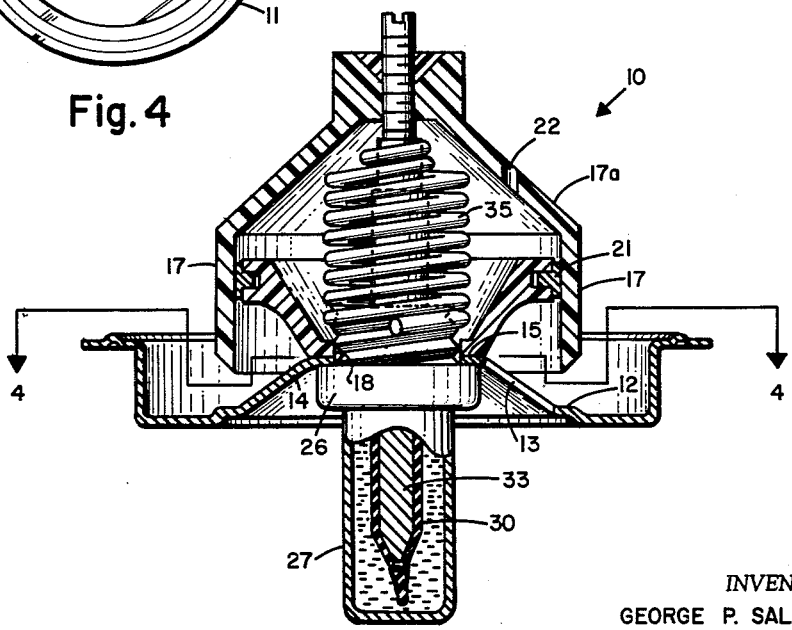
Fig. 3
INVENTOR.
GEORGE P. SALIARIS
BY
ATTORNEY United States Patent Office 3,154,249
Patented Oct. 27, 1964

3,154,249
THERMOSTATIC VALVES
George P. Saliaris, Worthington, Ohio, assignor to Ranco Incorporated, Columbus, Ohio, a corporation of Ohio
Filed Apr. 18, 1963, Ser. No. 273,913
3 Claims. (Cl. 236—34)

This invention relates to thermostatically operated valves, and more particularly to thermostatic valves suitable for controlling the flow of cooling liquid in cooling systems of internal combustion engines such as in automotive vehicles and the like. When so used, thermostatic control valves are generally termed "enginestats."

Because of the fact that the cooling liquid is usually water and/or certain anti-freeze chemicals, it is necessary to manufacture enginestats from corrosion resistant materials and heretofore the constructions of prior art thermostatic valves have been suitable for parts fabricated of metal stampings of brass, or other corrosion resistant metals and have not lent themselves well to the use of relatively inexpensive molded plastic components. Accordingly, it is one important object of this invention to provide a particularly effective yet simple thermostatic valve having a minimum of major components which may be conveniently and economically formed of commonly available plastic materials such as polyvinyl chloride and easily assembled so as to materially reduce the cost of production of the device.

As another object this invention aims to provide a novel and improved thermostatic valve, especially suitable for use as an enginestat, the operating characteristics of which are unaffected by pressures in the cooling system or forces of liquid flowing through the valve.

It is another object of this invention to provide a thermostatic valve providing the advantages mentioned in the preceding paragraphs and comprising a base plate presenting an annular valve seat on one side thereof and having a flow port therethrough, a molded substantially imperforate dish shape valve guide member centrally attached to the base plate and concentric with the annular valve seat and which slidingly guides a cup shape molded valve member receiving the guide member in fluid tight sliding relation with the rim thereof, the open side of the valve member moving to and from the annular valve seat for controlling the fluid flow through the port thereof, the cup shape valve member being moved with respect to the plate by a thermally responsive power means mounted on the plate and having a stem portion connected to the valve means for effecting the movement thereof in response to temperature changes in fluid on the side of the base plate opposite the valve seat.

Yet another object of this invention is the provision of an enginestat of the foregoing character wherein the dish shape member and the cup shape member are disposed symetrically about their central axes and are free of reentrant surfaces whereby these parts may be conveniently and inexpensively molded with precision from heat and corrosion resisting plastic material such as polyvinyl chloride, and the parts thereof cooperating with other parts may be machined by turning about their respective central axes. Also, these parts may be assembled without attention to angular location of one part relative to the other.

Figure 2:
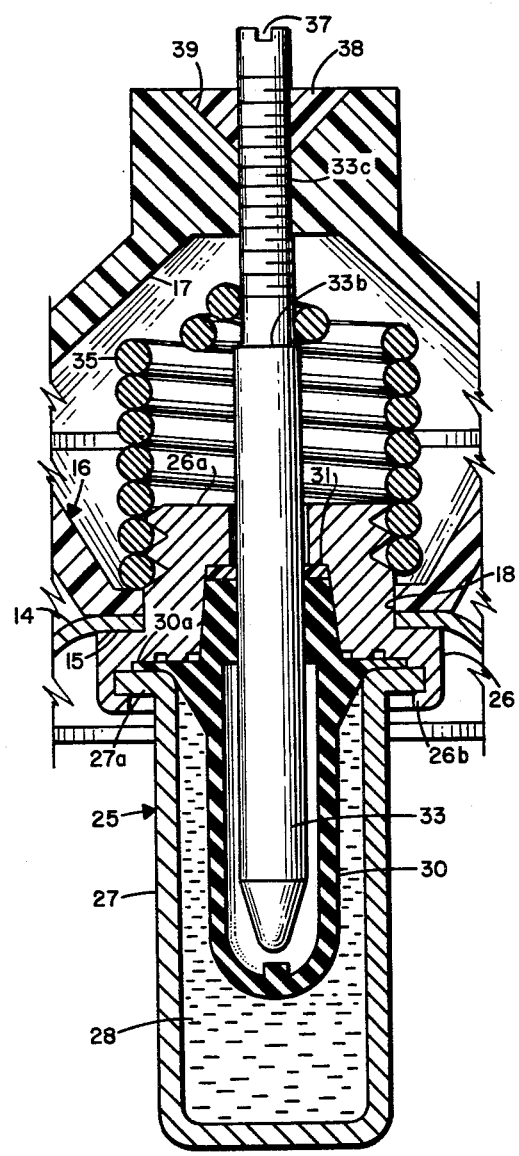

The invention may be further said to reside in certain constructions and combinations of parts as will become apparent from the following detailed description of a preferred embodiment of the invention read in conjunction with the accompanying sheets of drawings forming a part of this specification, and in which FIG. 1 is a vertical sectional view of a thermostatic valve embodying the invention;

FIG. 2 is an enlarged fragmentary sectional view of a portion of the valve of FIG. 1;
FIG. 3 is a view similar to FIG. 1 but showing parts in different operative positions;
FIG. 4 is a sectional view on a reduced scale taken along line 4—4 of FIG. 3; and
FIG. 5 is an exploded perspective view illustrating the various parts of the valve.

In the form of the invention shown in the drawings and described hereinafter, there is provided a thermostatic valve 10 comprising a circular, cup-shaped base plate 11 which is adapted to be seated into a water outlet opening in an engine cooling jacket (not shown) with a peripheral flange 11a clamped between an outlet fitting and the surface of the engine jacket in a conventional manner well understood by those skilled in the art to which the invention pertains. The base plate 11 is conveniently formed as a sheet metal stamping and has an upwardly embossed central portion defining an annular valve seat 12 on the upper side thereof. Opening through the base plate 11, and within the annular valve seat 12 is a flow port 13 which is divided into five segments by radially extending spider legs 14 supporting a centrally disposed ring 15.

The flow of water through port 13 is controlled by two cooperating valve members 16 and 17 which are formed of a suitable molded plastic material, such as polyvinyl chloride. The member 16 is a dish shaped valve guide member which has a central opening 18 positioned concentric with ring 15 of the base plate and seatingly secured thereto in a manner described hereinafter so that liquid cannot flow through the opening. Member 16 provides an imperforate circular ball which has a rim 16a lying in spaced parallel relation to the base plate 11, and concentric with the valve seat 12. The rim 16 is provided with an outwardly facing groove 20 in which is seated a resilient sealing ring 21.

Valve member 17 is cup shaped and receives guide member 16 therein so that rib 16a guides the valve member to and from seat 12 to open and close the valve port to the flow of water. When the open side of member 17 engages the valve seat the flow of water is blocked by the imperforate wall formed by member 16, and when member 17 is moved from the seat 12, water flows through port 13 outwardly between the seat and edges of the valve member. Preferably the open edges of member 17 are tapered to present a sharp narrow edge to the valve seat 12, thereby minimizing the area of the member subjected to pressure differential of the fluid pressure in the system. The conical wall portion 17a of the valve member 17 is provided with a vent opening 22 to accommodate changes in volume between the valve member and the wall member opening and closing movements of the valve member.

Valve member 17 is moved to and from valve seat 12 by a suitable power element 25 which may be of any suitable well known construction, best illustrated in FIG. 2, and comprising an annular bushing 26 having an externally threaded boss 26a extending upwardly through the opening of ring 15, with the bushing proper resting against the underside thereof. A cup 27 having an upper flange 27a contains a thermally expansible medium 28 such as a mixture of wax with powdered copper therein, and a flexible rubber sleeve 30 having a flange 30a overlying the cup flange 27a. The cup 27 is secured to the bushing 26 with the flange 30a of the sleeve 30 clamped therebetween by crimping the lower edge 26b of the bushing around the flange 30 as shown.

The boss 26a has a central bore provided with a guide bushing 31 of friction reducing material such as polytetrafluoroethylene (known as "Teflon"). An axially movable stem 33 extends downwardly through the guide 31 into the flexible sleeve 30. The lower end of the stem 33 is rounded or pointed as at 33a so that when the cup 27 and medium 28 are subjected to the melting temperature of the wax, such as between 177° F. and 182° F., the medium will expand and radially compress the flexible sleeve, thereby squeezing the stem 33 in an upward direction as shown in FIG. 3 of the drawings.

The upper end portion of the stem 33 is reduced to form a shoulder 33b and is externally threaded as shown at 33c. The stem 33 is normally biased downwardly into the sleeve 27 by a coil spring 35 having its lower end convolutions threadedly engaged on the externally threaded boss portion 26a of the bushing 26, and having its upper end convolutions wrapped inwardly around the threaded portion 33c of the stem 33 and resting against the shoulder 33b thereof. It will be appreciated that the spring 35 acts also as a nut to secure the power element 25 to the base plate 11 and clamps the central portion of valve member 16 and the bushing 26 to opposite sides of ring 15 to provide a liquid tight seal.

It will be recognized that the pressures in the cooling jacket below the valve device 10 can act only in a radial direction on the movable valve member 17 and therefore have no effect on the opening or closing movements of the valve. Similarly, the force of liquids flowing through the valve will have substantially no effect thereon.

The stem 33 is provided with a screwdriver slot 37 which permits the stem to be advanced or retracted with respect to the valve member 17 so as to position the valve member to be tightly closed on the valve seat when the power element is below the desired opening temperature and to insure its opening when the medium 28 expands in response to the occurrence of a predetermined temperature.

When the desired calibration setting of the threaded stem 33c is achieved, and this is usually such that the power element 25 will start to open the valve at a temperature of from 177° F. to 182° F. The stem 33 is secured in its adjusted position by the application of an epoxy resin cement 38 in a suitable conical depression 39 formed in the apex of the valve member 17 around the threaded portion of the stem 33.

The shape and configuration of the cooperating wall member 16 and valve member 17, because of their symmetrical configurations about their central axes and lack of reentrant portions, suits them admirably to be molded from inexpensive, non-corrosive, and easily machined plastic materials such as polyvinyl chloride, and to be turned about their respective axes for machining of the groove 16a and the valve edge 17c, thereby greatly reducing the manufacturing costs of the valve 10. Furthermore, the parts being principally circular need not be positioned in any particular angular positions relative to one another during assembly thereof, which expedites this phase of the manufacture of the device.

From the foregoing detailed description, it will be appreciated that there has been provided by this invention an improved thermostatic valve suitable for use as an enginestat in the cooling system of internal combustion engines. It will also be appreciated that the improved valve of this invention is substantially independent of cooling system pressures and the force of liquid flowing therethrough, and embodies a particularly simple yet effective construction which lends itself to economical manufacture through the use of inexpensive materials and methods.

Although the invention has been described in considerable detail and with reference to a specific thermostatic valve embodying the invention, it will be understood that the invention is not limited thereto, but rather the invention includes all those changes, adaptations, modifications, substitutions, and uses as are reasonably embraced by the scope of the claims hereof.

Having thus described my invention, I claim:

1. A thermostatic valve of the character described comprising:
    (a) a circular base plate presenting an annular valve seat on one side thereof, said plate having a flow port therethrough within said annular valve seat, and a ring supported within said port and concentric with said valve seat,
    (b) means defining a circular wall and having its rim concentric with said valve seat, and in spaced parallel relation thereto,
    (c) a cylindrical valve means surrounding said circular wall in fluid tight sliding relation to the rim thereof and presenting a circular edge for movement to and away from said seat for controlling fluid flow through said port,
    (d) a thermally responsive power means mounted on said ring and having a stem including a reduced end connected to said cylindrical valve means for effecting said movement in response to temperature changes in fluid on the side of said base plate opposite said one side thereof,
    (e) said power means including a threaded portion extending through said ring and a shoulder bearing thereagainst,
    (f) a tension spring having convolutions at one end threadedly engaged on said threaded portion and securing said power means to said ring, and
    (g) said tension spring having convolutions at the other end wrapped about the reduced end of said stem, whereby said spring urges said cylindrical valve means toward said base plate.

2. A thermostatic valve as defined in claim 1 wherein said reduced end of said stem is adjustably connected with said cylindrical valve means, whereby the biasing force of said spring may be selectively varied.

3. A thermostatic valve as defined in claim 2, wherein said means defining a circular wall and said valve member are members formed of molded plastic material, said members being symmetrical about their central axes and substantially free of reentrant wall surfaces.

References Cited in the file of this patent

UNITED STATES PATENTS

| | | |
|---|---|---|
| 2,765,983 | Mayo | Oct. 9, 1956 |
| 2,982,477 | Drapeau | May 2, 1961 |
| 2,996,254 | Freismuth | Aug. 15, 1961 |
| 3,087,676 | Neher et al. | Apr. 30, 1963 |